Nov. 15, 1927. 1,649,220

A. M. GOODLOE

DUST SEPARATOR

Filed Dec. 6, 1924   2 Sheets-Sheet 1

INVENTOR
Alfred M. Goodloe
BY C. P. Goepel
ATTORNEY

Nov. 15, 1927.
A. M. GOODLOE
DUST SEPARATOR
Filed Dec. 6, 1924
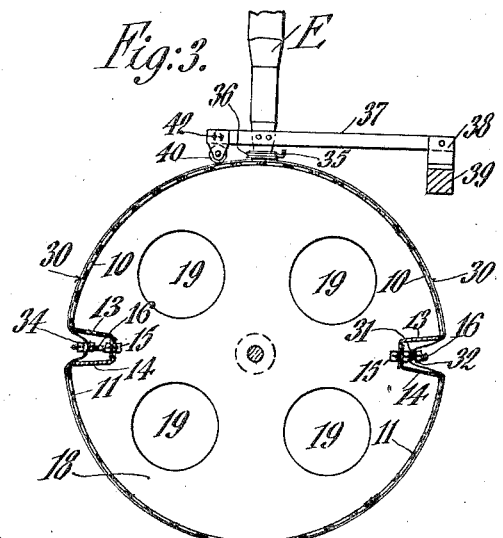
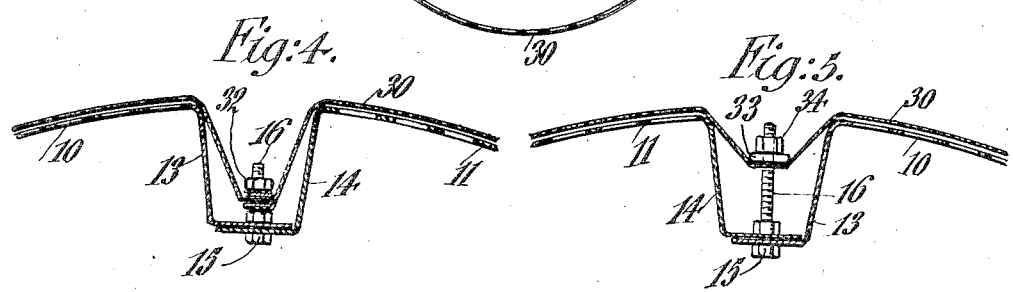
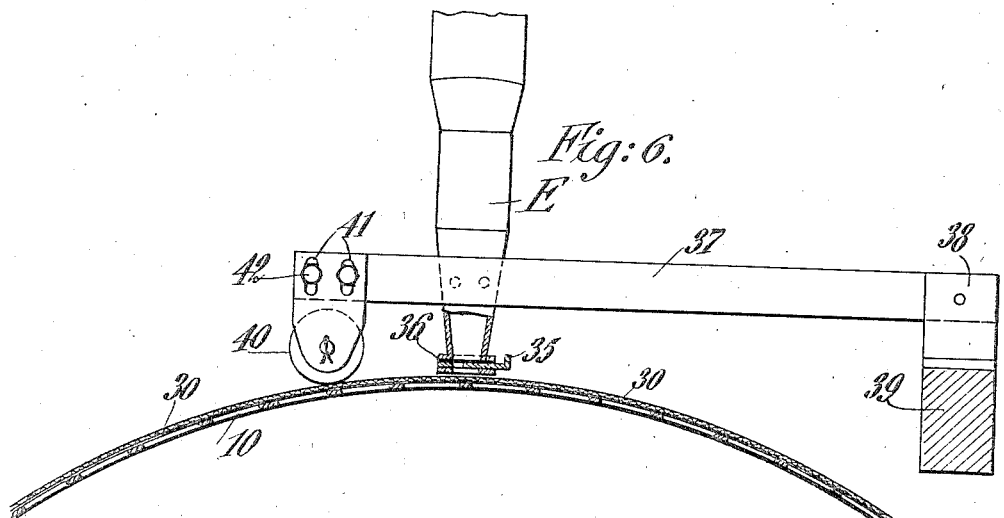
INVENTOR
Alfred M. Goodloe
BY C. P. Goepel
ATTORNEY Patented Nov. 15, 1927.

1,649,220

UNITED STATES PATENT OFFICE.

ALFRED M. GOODLOE, OF NEW YORK, N. Y., ASSIGNOR TO MIDWEST STEEL & SUPPLY CO. INC., OF NEW YORK, N. Y., A CORPORATION OF NEW YORK.

DUST SEPARATOR.

Application filed December 6, 1924. Serial No. 754,239.

This invention relates to dust separators adapted for the separation of solid particles from air and other gases.

The efficient separation of solid particles from air and other gases is of great importance in a number of industries. The objects of such separation may be enumerated as follows: first, for the purpose of collecting or reclaiming valuable dust, such as pigments, flour, cement, etc.; second, to separate process dust created in factories or work rooms for the purpose of recirculating the air into the rooms in order to save heat; third, to separate the dust before the air is exhausted into the open to prevent the dust from causing a nuisance in the neighborhood; fourth, to separate dust particles of various coarseness from one another, and from the air or gas carrying them; and others which may present themselves. The dust separator in accordance with the present invention is particularly adapted for such purposes.

The principle upon which this invention is based is that of forcing dust laden air or gas through screening elements which catch and retain the solid particles whereas the air and gas pass through, and of removing the solid particles from the screening elements by means of local secondary air currents applied to the screening elements. Under this method, provision is also made to conduct the secondary air currents which carry the accumulated dust away from the screening elements into bags or other suitable receptacles.

To that end a practical embodiment of the invention as hereinafter described in detail, comprises a rotary drum having its cylindrical portion preferably perforated, or formed of a wire mesh, over which is stretched a textile fabric, asbestos weave, the material depending upon the conditions obtaining where the separator is to be used, and through which material the dust laden air or gases are passed. Where the air or gases to be cleaned are cool and dry, a suitable textile fabric is preferable, and where the dust laden air or gases are hot, asbestos cloth, wire mesh, perforated sheets, or a combination of these are suitable for the purpose.

Screening materials of this character have a tendency to clog up quickly unless provision is made for frequently removing the accumulated dust. An essential feature of the invention consists in accomplishing this cleaning of the screening elements by means of secondary local air currents applied to the screening elements and which carry the accumulated dust into suitable nozzles or receptacles. The most practicable way of accomplishing this is to use vacuum cleaners, the intake nozzles of which are arranged in proximate contact with the dirty side of the screening elements and which are further so arranged in relation to the screening elements that all surface points of the screening elements will be cleaned during each cycle of operation.

The primary object of the invention is to provide a dust separator constructed on the basis of the principles outlined which will be continuous and automatic in operation and will maintain a substantially constant resistance to the flow of the air or gases through the screening elements and further will be an efficient dust catcher and inexpensive to operate.

With the foregoing and other objects in view as will appear, the invention will be described in detail as applied to a preferred embodiment which is illustrated in the accompanying drawings forming a part of this specification.

In the drawings, in which similar characters of reference designate corresponding parts in the several views:

Figure 3 is a vertical sectional view taken on line 3—3 of Figure 2, and

Figures 4, 5, and 6 are enlarged detail views of the construction and arrangement of various parts.

Figure 1:
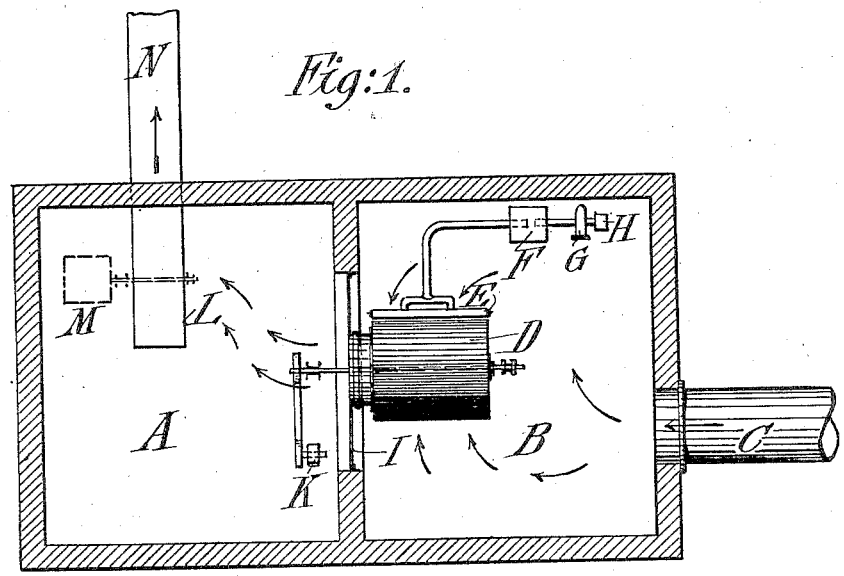
Figure 1 is a vertical sectional view with parts in elevation showing the arrangement of a dust separating apparatus installed in accordance with this invention.

Referring to the drawings, Figure 1 shows the general arrangement of the apparatus in accordance with the preferred embodiment of the invention, in which a housing has a clean air compartment, which is designated by the letter A and a dirty air compartment designated by the letter B. In this arrangement the dirty air compartment is provided with an inlet conduit C, and within it is a dust separator drum D with a vacuum cleaner nozzle E adjacent to and above the same. The suction tube from the nozzle E leads to a dust collector chamber F which is provided with suitable dust collectors, such as bags or the like, and from there to a vacuum pump G, which is driven by a motor H. The two compartments are separated by a wall having an aperture therein, in which aperture is fitted a metal plate 1 which supports part of the dust separator D. In the clean air compartment A are arranged a motor K for rotating the drum D, and the exhaust fan L with its driving motor M. Extending from the fan L is a conduit N which provides an outlet duct for the clean air chamber.

Figure 2:
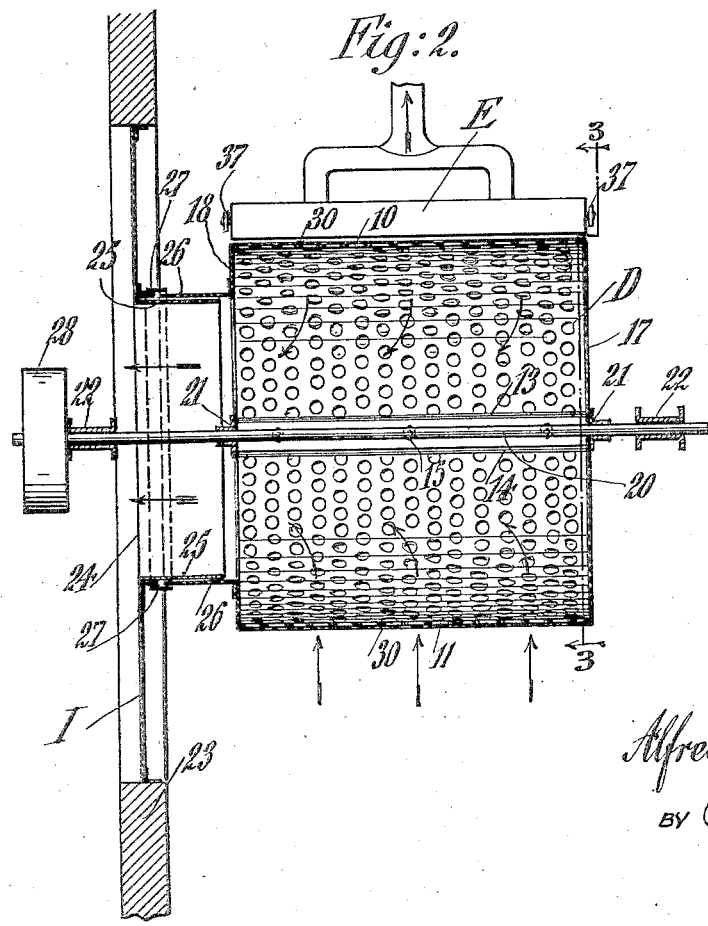
Figure 2 is a similar vertical sectional view, with parts in elevation of a portion of said apparatus on a larger scale showing the arrangement of the rotary drum and vacuum cleaner nozzle.

Referring to Figures 2 and 3, which illustrate the separating drum D, the drum is constructed of two semi-cylindrical portions 10 and 11 of perforated metal or other suitable material, having their meeting ends 13 and 14 projected inwardly and overlapping at the points 15 where they are secured by means of suitable bolts 16. The drum has a closed end member 17 at one end and to the other end is secured end member 18 having therein a plurality of discharge openings 19. The drum is supported on a shaft 20 which is secured to the end members by means of suitable collars 21. This shaft 20 in turn is supported in bearings 22, one of which is within the clean air compartment A and the other in the dust compartment B.

The bearings 22 are so positioned that the drum D is arranged centrally of the opening 23 between the chambers A and B. As heretofore set forth, the wall or metal plate 1 is supported in this opening 23, and it is apertured at 24 and provided with a conduit collar 25 which is arranged concentric with the axis of the drum. The drum is likewise provided with a collar or sleeve member 26, which fits over the collar 25 and in order to provide a tight connection between said members a collar 27 of leather, canvas or other suitable material is arranged to cover the joint.

The shaft 20 is provided at its outer end with a pulley 28 which is driven by the motor K as previously set forth, by means of a belt 29.

The drum D is covered with a screening material 30, such as a suitable textile fabric, woven asbestos or wire mesh, depending upon the conditions under which the dust remover is to be operated. The manner of mounting and stretching this screening material is best shown with reference to Figures 3, 4 and 5. As shown therein, the ends 31 of the material are positioned on bolts 16 and secured in place by means of nuts 32. The material is further stretched by means of a bar 33 which passes over the material and is engaged on the other set of bolts 16 on the opposite side of the drum, and by means of nuts 34 the tension upon the material may be adjusted as may be necessary.

Means for cleaning the fabric as shown and heretofore referred to comprises the vacuum apparatus having a nozzle E arranged above the drum. This nozzle as best shown in Figure 6, is provided with a valve member 35 operating in a slot 36 in the lower end of the nozzle just above the drum and by means of this valve member the width of the suction opening may be varied.

The height of the nozzle above the drum is also adjustable as the nozzle is mounted in a pair of arms 37 arranged at either end thereof, which arms in turn are pivotally supported at 38 on a supporting beam 39. On the outer ends of arms 37 is a pair of supporting rollers 40, one engaging each end of the drum D. These rollers 40 are supported in bearing members which are secured to the arms 37 by a pin slot connection, comprising slots 41 and bolts 42, which afford an adjustable connection with the arms whereby the arms may be raised or lowered with respect to the drum.

These adjustable features of the vacuum nozzle E provide means whereby the cleaning operation may be controlled according to the different conditions under which the separator is to be used. When the size of the nozzle opening and its height above the drum have been regulated for the best results for the particular operation they may be maintained in such adjustment.

In the operation of the apparatus, when the various motors are operating the course of air or gases is as follows: The dust laden air enters the conduit C and passes through the periphery of drum D; a portion of the air comprising a secondary current is drawn back with dust particles, which were deposited on the periphery of drum D, through nozzle E and into the chamber F, where the dust is retained, and the air again released into chamber A. The greater portion of the air passes from the drum D on through apertures in partition 1 into the clean air chamber A and thence through the exhaust pump L, which is a means of drawing the air through the chambers, and from there through the outlet conduit N. The course of the air is generally represented by means of the series of arrows.

Having disclosed one preferred embodiment of the invention, it is understood that various changes and alternate constructions may be employed in view of that herein specifically shown and described without departing from the spirit of the invention as set forth in the following claims.

I claim—

1. In an apparatus for removing solid matter from gases, a separating drum comprising two semi-cylindrical members provided with inwardly extending ends arranged to overlap each other, bolt members extending through said end members for securing the parts of the drum together, end members for the drum, one end having an opening for allowing gases to pass through, a strip of screening material having its ends engaging and fastened to the drum securing bolts on one side of the drum, a rod positioned on the ends of the bolts on the other side of the drum and over the middle portion of the strip of screening material in said position, and nuts on the ends of said bolts over said rod for holding the rod for adjusting the tension thereof upon said screening material.

2. An apparatus for removing solid matter from gases comprising in combination a compartment having an intake for the gases from which the solid matter is to be removed and an outlet for the gases, a separator for removing the solid matter from the gases comprising a drum arranged at the outlet of the chamber and having its periphery apertured and covered with a screening material upon which solid matter is to be deposited and through which the gases are adapted to pass, means for rotating the drum, means for removing the solid matter from the screening material comprising vacuum apparatus having a nozzle with an adjustable opening arranged adjacent to the drum, pivoted arms connected with and supporting the nozzle above the drum, rollers having adjustable connections with the ends of said arms and resting on the drum for supporting the nozzle at the proper distance above the screening material, a vacuum pump for drawing the gases through said nozzle, and means for causing the gases to pass through the compartment.

3. An apparatus for cleaning gases comprising in combination a compartment for the gases to be cleaned and an outlet for the gases, a separator for removing the impurities from the gases comprising a drum arranged in connection with the outlet of the chamber and having its periphery apertured and covered with screening material upon which the impurities are to be deposited and through which the gases are adapted to pass, means for rotating the drum, means for removing the impurities from the screening material comprising vacuum apparatus having a nozzle with an adjustable opening arranged adjacent to the drum, means for positioning the vacuum cleaner nozzle in proper and adjustable relation to the screening material, a vacuum pump for drawing the gases through said nozzle, and means for causing the gases to pass through the compartment.

4. In an apparatus of the class described, a drum having a foraminous cylindrical wall provided with deep radial pockets, previous sheet screening material overlying said drum surface and the pocket openings, tensioning bars overlying said sheet material in the pockets, and means for adjustably drawing the bars radially inward to adjustably tension the sheet material, the radial dimension of the pockets admitting complete tensioning entry of the bars therein while the bars and fabric are spaced outward from the bottoms of the pockets.

5. In an apparatus of the class described, a drum having a foraminous cylindrical wall provided with deep radial pockets, pervious sheet screening material overlying said drum surface and the pocket openings, tensioning bars overlying said sheet material in the pockets, and bolts passing through the bars and the pocket bottoms and nuts cooperating with the bolts to draw the bars radially inward to adjustably tension the sheet material, the pockets being dimensioned radially to admit an ample range of movement of the bars inwardly in the pockets without contact of the bars or sheet material with the pocket bottoms.

In testimony that I claim the foregoing as my invention, I have signed my name hereto.

ALFRED M. GOODLOE.